United States Patent
Peng (10) Patent No.: US 10,959,177 B2
(45) Date of Patent: Mar. 23, 2021

(54) ENERGY DETECTION METHOD WITH LOW POWER CONSUMPTION AND COMMUNICATION DEVICE THEREOF

(71) Applicant: Realtek Semiconductor Corp., HsinChu (TW)

(72) Inventor: Zuohui Peng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 16 days.

(21) Appl. No.: 16/669,441

(22) Filed: Oct. 30, 2019

(65) Prior Publication Data
US 2021/0022076 A1    Jan. 21, 2021

(30) Foreign Application Priority Data
Jul. 19, 2019 (CN) .......................... 201910653690.3

(51) Int. Cl.
*H04B 1/38* (2015.01)
*H04W 52/02* (2009.01)
*H04L 5/00* (2006.01)

(52) U.S. Cl.
CPC ....... *H04W 52/0235* (2013.01); *H04L 5/0082* (2013.01); *H04W 52/028* (2013.01); *H04W 52/0232* (2013.01)

(58) Field of Classification Search
CPC ......... H04W 52/0235; H04W 52/0232; H04W 52/028; H04W 88/02; H04L 5/0082; H04M 1/72519; H04M 1/72522
USPC ............... 370/329, 330; 455/418, 550.1, 574
See application file for complete search history.

(56) References Cited

U.S. PATENT DOCUMENTS

| 2009/0093232 A1* | 4/2009 | Gupta | ................... H04L 63/104 455/410 |
| 2013/0189939 A1* | 7/2013 | Wang | ................... H04W 64/00 455/127.1 |
| 2014/0285143 A1* | 9/2014 | Kwon | ..................... H02J 50/20 320/108 |

(Continued)

FOREIGN PATENT DOCUMENTS

| CN | 106648021 A | 5/2017 |
| CN | 107466095 A | 12/2017 |

(Continued)

*Primary Examiner* — Danh C Le
(74) *Attorney, Agent, or Firm* — Winston Hsu (57) ABSTRACT

An energy detection method includes the following steps: controlling a communication device to enter a sleep mode during a first time interval; intermittently turning on and turning off a part of receiving functions of the communication device during a second time interval, in which the second time interval is after the first time interval, and when the part of receiving functions of the communication device are turned on, the communication device is controlled to receive a signal; and determining if a beacon signal is present according to energy of the signal received by the communication device. The first time interval and the second time interval form a detection period. First average power consumption of the communication device during the second time interval is smaller than second average power consumption of the communication device, in which the second average power consumption corresponds to enabling all receiving functions of the communication device.

20 Claims, 3 Drawing Sheets

(56) References Cited

U.S. PATENT DOCUMENTS

| | | | |
|---|---|---|---|
| 2014/0348345 A1* | 11/2014 | Furst | H04R 19/005 |
| | | | 381/111 |
| 2015/0119071 A1* | 4/2015 | Basha | G01S 11/06 |
| | | | 455/456.1 |
| 2015/0214775 A1* | 7/2015 | Lee | H04B 5/0037 |
| | | | 320/137 |
| 2016/0366640 A1 | 12/2016 | Maeda | |
| 2017/0273022 A1 | 9/2017 | Kazmi | |
| 2018/0035356 A1* | 2/2018 | Gupta | H04W 8/005 |
| 2019/0110252 A1* | 4/2019 | Shibuya | H04W 52/0251 |
| 2019/0215771 A1 | 7/2019 | Kim | |
| 2019/0391633 A1* | 12/2019 | Wu | G06F 1/28 |
| 2020/0021138 A1* | 1/2020 | Yeo | H02J 50/12 |
| 2020/0100189 A1* | 3/2020 | Liu | H04W 52/383 |
| 2020/0178005 A1* | 6/2020 | Longaa | H04R 25/30 |

FOREIGN PATENT DOCUMENTS

| | | |
|---|---|---|
| CN | 109150224 A | 1/2019 |
| KR | 10-2018-0121068 A | 11/2018 |
| KR | 10-1986099 B1 | 6/2019 |

\* cited by examiner

ENERGY DETECTION METHOD WITH LOW POWER CONSUMPTION AND COMMUNICATION DEVICE THEREOF

BACKGROUND OF THE INVENTION

1. Field of the Invention

The present disclosure illustrates an energy detection method with low power consumption and a communication device, and more particularly, an energy detection method and a communication device for intermittently turning on and off a part of receiving functions in order to reduce power consumption.

2. Description of the Prior Art

With advancement in the wireless communication technologies, portable devices can support various wireless network protocols and networking functions. For example, tablets, smartphones, or personal digital assistant (PDA) devices can support Bluetooth communication and Wi-Fi communication. Since power stored in the portable device is limited, a design for driving a wireless communication device with low power consumption becomes a very important and challenging target. In the wireless communication technologies, a wireless terminal, e.g., a portable device, and a signal access point (AP) router are required to exchange a small number of packets for maintaining a wireless link. Therefore, how to minimize power consumption when the small number of packets between the wireless terminal and the signal access point is exchanges becomes an important design issue.

In the current wireless communication technologies, a wireless terminal can receive a beacon signal as an indicator signal broadcasted from the signal access point. In order to reduce power consumption, the wireless terminal can periodically turn on all receiving functions for detection if the indicator signal broadcasted by the signal access point is received. In practice, the wireless terminal can enter a sleep mode for a period of time by using a low driving current. After the period of time elapses, the wireless terminal can enter an active mode for another period of time for driving all the receiving functions in order to detect the indicator signal. However, although the wireless terminal operated in the sleep mode has low power consumption, the wireless terminal operated under the active mode has extremely high power consumption. In other words, most of the power required for maintaining the wireless link between the wireless terminal and the signal access point is distributed during the active mode. In the current wireless communication technologies, it is hard to effectively reduce the power consumption during the active mode while maintaining satisfactory link stability. Therefore, how to reduce the power consumption of the wireless terminal during the active mode while maintaining satisfactory stability and providing tolerable detection accuracy is an important design trend.

SUMMARY OF THE INVENTION

In an embodiment of the present disclosure, an energy detection method is provided. The energy detection method includes the following steps: controlling a communication device to enter asleep mode during a first time interval; intermittently turning on and turning off a part of receiving functions of the communication device during a second time interval, in which the second time interval is after the first time interval, and when the part of receiving functions of the communication device are turned on, the communication device is controlled to receive a signal; and determining if a beacon signal is present according to energy of the signal received by the communication device. The first time interval and the second time interval form a detection period. First average power consumption of the communication device during the second time interval is smaller than second average power consumption of the communication device, in which the second average power consumption corresponds to enabling all receiving functions of the communication device.

In another embodiment of the present disclosure, a communication device capable of detecting presence of a beacon signal broadcasted from a signal access point is provided. The communication device includes a transceiver, an energy detector, a power supply, and a processor. The transceiver is used for receiving a signal. The energy detector is used for detecting energy of the signal. The power supply is used for providing driving power of the communication device. The processor is used for controlling the power supply. The processor controls the power supply to make the communication device enter a sleep mode during a first time interval. The processor controls the power supply to intermittently turn on and off a part of receiving functions of the communication device during a second time interval, in which the second time interval is after the first time interval. When the part of receiving functions of the communication device are turned on, the processor controls the transceiver to receive the signal. The processor determines if the beacon signal is present according to the energy detected by the energy detector. The first time interval and the second time interval form a detection period. First average power consumption of the communication device during the second time interval is smaller than second average power consumption of the communication device, in which the second average power consumption corresponds to enabling all receiving functions of the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
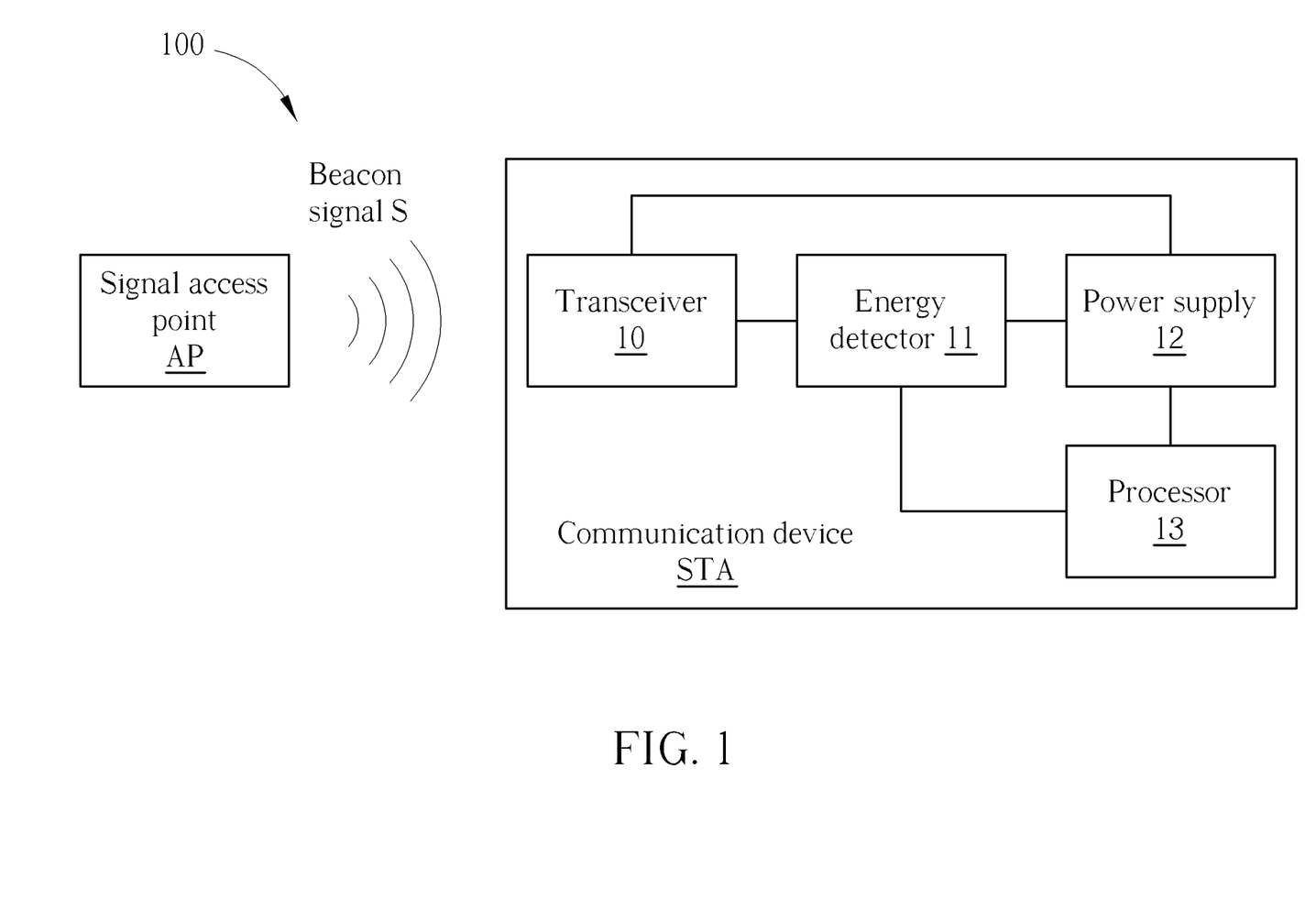
FIG. 1 is a block diagram of a communication system according to an embodiment of the present disclosure.

FIG. 1 is a block diagram of a communication system 100 according to an embodiment of the present disclosure. The communication system 100 can be any wireless communication system including a transmitting device and a receiving device. Further, the communication system 100 can transmit data packet by using any reasonable communication protocol. In FIG. 1, the communication system 100 may include a signal access point AP and a communication device STA.

The signal access point AP is used for broadcasting a beacon signal S. The communication device STA is used for detecting the beacon signal S. The signal access point AP may be a router of a wireless network. The communication device STA can be any device capable of accessing the network, such as a tablet device, a smart phone or a personal digital assistant. The signal access point AP and the communication device STA can perform an uplink or a downlink data transmission.

The communication device STA may include a transceiver 10, an energy detector 11, a power supply 12, and a processor 13. The transceiver 10 is configured to receive the beacon signal S or to transmit a link request message to the signal access point AP. The transceiver 10 can transmit and receive a wireless signal with any reasonable wireless communication protocol, such as a Wi-Fi signal.

The energy detector 11 is coupled to the transceiver 10 and configured to detect energy of a signal received by the transceiver 10. The energy detector 11 can be an integrator for performing an integration process of the signal received by the transceiver 10 over time. An integrated area can be denoted as signal energy.

The power supply 12 is coupled to the transceiver 10 and the energy detector 11 and configured to provide driving power of the communication device STA. The power supply 12 can be any power providing component, such as a DC (Direct Current) power source, an AC (Alternating Current) power source, or a battery.

The processor 13 is coupled to the energy detector 11 and the power supply 12 for controlling the power supply 12 according to the energy detected by the energy detector 11. The processor 13 can be any processing device, such as a single chip processor on a Media Access Control (MAC) layer. The processor 13 can also be configured to process a baseband signal of the communication device STA. In some embodiments, the energy detector 11 and the processor 13 can also be integrated into one chip. Any reasonable hardware modification falls into the scope of the present disclosure.

In the communication system 100, the beacon signal S can be periodically detected. For example, a detection period can include a first time interval and a second time interval. The processor 13 can control the driving power provided by the power supply 12. After the processor 13 controls the power supply 12, the communication device STA enters a sleep mode during the first time interval. The processor 13 can control the power supply 12 for intermittently turning on and turning off a part of receiving functions of the communication device STA during a second time interval after the first time interval elapses. For example, functions of the transceiver 10 and the energy detector 11 can be intermittently turned off and turned on. When the function of the energy detector 11 is turned on, the energy of the signal received by the transceiver 10 can be detected during the second time interval. In other words, when the part of receiving functions of the communication device STA are turned on, the processor 13 can control the transceiver 10 to be prepared to receive the beacon signal S. Then, the processor 13 can determine if the beacon signal S is present according to the energy detected by the energy detector 11 during the second time interval. Further, since the communication device STA intermittently turns on and turns off the part of receiving functions during the second time interval, average power consumption of the communication device STA during the second time interval is smaller than average power consumption of the communication device of which all receiving functions are enabled. Details of a driving mode of the communication device STA during the detection period are illustrated in the following paragraphs.

Figure 2:
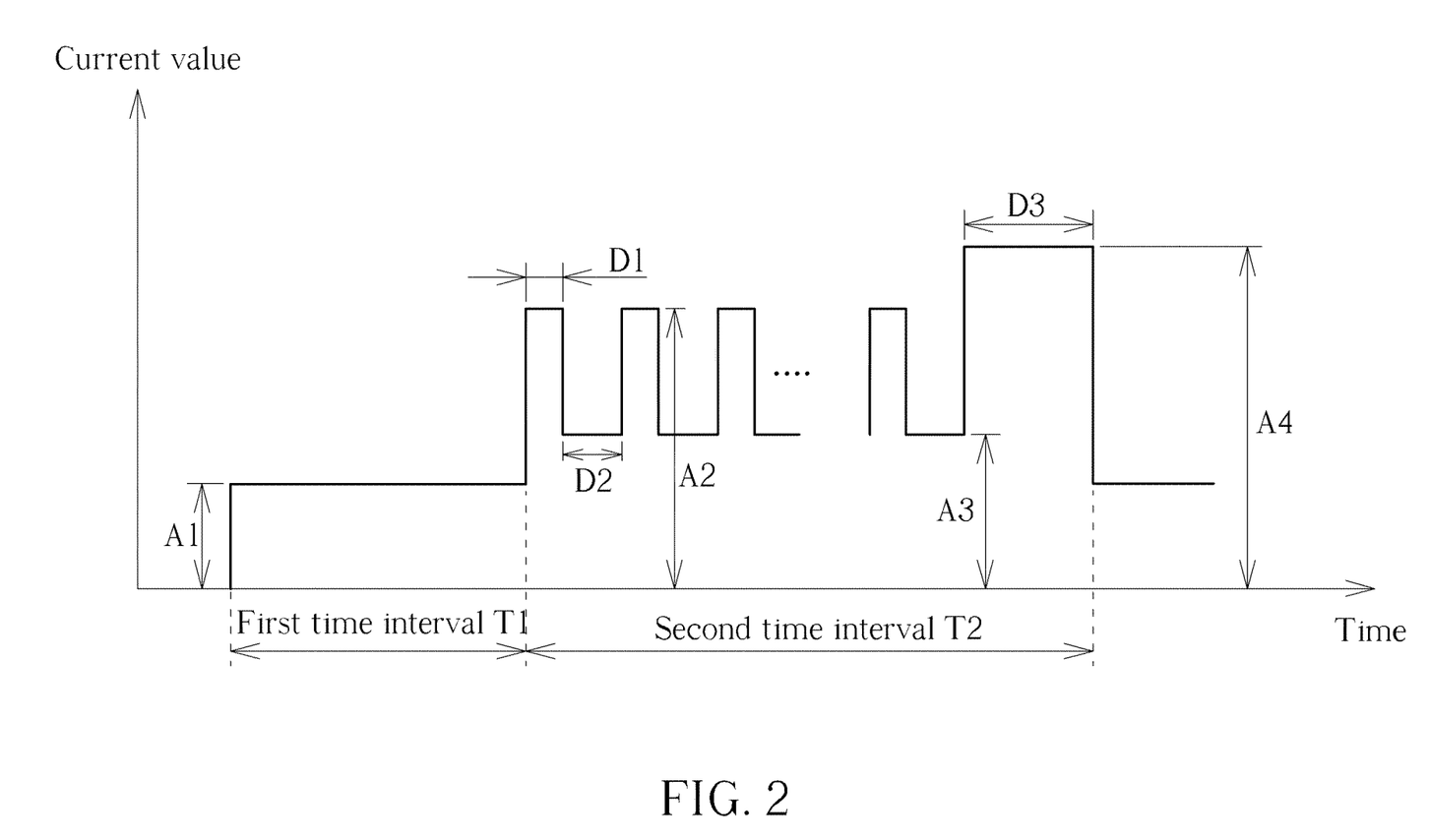
FIG. 2 is a schematic diagram illustrating a driving current of a communication device of the communication system in FIG. 1.

FIG. 2 is a schematic diagram illustrating a driving current of a communication device of the communication system in FIG. 1, in which the driving current varies with respect to time. The x-axis represents time. The y-axis represents current, i.e., a driving current (value). The communication device STA is operated in the sleep mode during the first time interval T1. The first current value A1 corresponding to the sleep mode of the communication device STA is very low, such as 0.1 mA (milliamperes). The second time interval T2 follows the first time interval T. The communication device STA can turn on the part of receiving functions for detecting the energy of the signal received by the transceiver 10 for a period of time at the beginning of the second time interval T2. For example, the processor 13 can turn on the part of receiving functions of the communication device STA during a first operation time interval D1 right after entering the second time interval T2. In some embodiments, the first time interval D1 can be set as 500 nanoseconds (ns) or longer. The second current value A2, e.g., 40 mA, corresponding to turning on the part of receiving functions of the communication device STA is higher than the first current value A1. During the first operation time interval D1, the energy detector 11 of the communication device STA can detect energy of the signal received by the transceiver 10 for determining if the beacon signal S is present. The energy detector 11 can use an integration process for detecting the energy. When the energy is smaller than a threshold, it implies that no beacon signal S is broadcasted from the signal access point AP, in which the threshold can be adjusted according to energy of preamble of the beacon signal S. Then, the processor 13 can generate a determining result that the beacon signal is absent and can turn off the part of the receiving functions of the communication device STA for a period in order to reduce the power consumption. For example, the processor 13 can turn off the part of receiving functions of the communication device STA during a second operation time interval D2 when the energy is smaller than the threshold during the first operation time interval D1. The second operation time interval D2 can be set as 1 microsecond (μs). A third current value A3, e.g., 2 mA, corresponding to turning off the part of the receiving functions of the communication device STA is lower than the second current value A2. Further, the processor 13 can turn on the part of receiving functions of the communication device STA again during a time interval for detecting the beacon signal S after the part of receiving functions of the communication device STA are turned off during the second operation time interval D2. In other words, after the first time interval T1 of the sleep mode elapses, when no beacon signal S is broadcasted from the signal access point AP, the communication device STA can intermittently turn on some receiving functions, turn off some receiving functions, and turn on some receiving functions during different time intervals for continuously detecting the beacon signal S. Further, after the first time interval T1 of the sleep mode elapses, since the communication device STA is operated under a low-power state by turning off the part of the receiving functions for almost half of the time interval T2, an average power consumption of the communication device STA during the second time interval T2 can be greatly reduced. Further, the processor 13 can continuously control the energy detector 11 for detecting the energy during a next detection period when the processor 13 determines that the beacon signal S is absent during the second time interval T2. The communication device STA can enter a next first time interval T1 of the sleep mode or can transmit a request to the signal access point AP for re-establishing a wireless link.

Further, when the energy detected by the energy detector 11 is greater than or equal to the threshold, it implies that the beacon signal S might be broadcasted from the signal access point AP. Then, the processor 13 can perform a correlation matching process of the beacon signal S. For example, the processor 13 can extract preamble information from the signal received by the transceiver 10 for a matching process of the beacon signal S. In FIG. 2, it should be noted that since the communication device STA intermittently turns on and turns off the part of the receiving functions, it is possible that the beacon signal S is broadcasted at a time point within the second operation time interval D2 but cannot be received by the communication device STA. The communication device STA can receive the beacon signal S in a next first operation time interval D1. In other words, a time point of receiving the beacon signal S by the communication device STA may be slightly delayed from a time point of broadcasting the beacon signal S by the signal access point AP. However, according to preamble characteristics of the beacon signal S, even if the communication device STA receives the beacon signal S with a slight delay, e.g., 1 μs, the processor 13 can still make a correct decision of a presence of the beacon signal S. In other words, the processor 13 can determine that the beacon signal S is present when the energy is greater than or equal to the threshold, and when an offset of the energy is smaller than a tolerance value (i.e., the recognized bits amount and energy match with the preamble of the beacon signal S). When the offset of the energy is greater than the tolerance value, the processor 13 can intermittently turn on and turn off some receiving functions for continuously detecting the beacon signal S. In some embodiments, the correlation matching process can be an optional process. Any reasonable technology modification falls into the scope of the present invention.

In the communication system 100, during the second time interval T2, the communication device STA is in the active mode for "intermittently" turning on and turning off the part of receiving functions. When the energy detected by the energy detector 11 of the communication device STA is greater than or equal to the threshold, it implies that the beacon signal S might be broadcasted from the signal access point AP. Then, the processor 13 can perform a subsequent link stage process of the communication device STA when the beacon signal S is present. For example, the communication device STA can perform a link stage process during the third operation time interval D3 for turning on all receiving functions in order to receive complete content of the beacon signal S. Therefore, a fourth current value A4, e.g., 50 mA, of turning on all the receiving functions is higher than the second current value A2. When the energy detected by the energy detector 11 is smaller than the threshold, it implies that the beacon signal S might be absent. Then, the processor 13 can continuously control the energy detector 11 for detecting the energy within a next detection period in order to detect if the beacon signal S is present.

In FIG. 2, in order to specifically illustrate how to reduce power consumption in the energy detection method performed by the communication device STA, a set of communication parameters is applied to the communication device STA. An average current for driving the communication device STA can be derived accordingly. However, the communication parameters applied to the communication device STA are not limited to certain or specific values. The communication parameters applied to the communication device STA are, for example, listed in Table 1 below.

TABLE 1

| | |
|---|---|
| the first time interval T1: | 99.4 ms |
| the second time interval T2: | 3 ms |
| the first current value A1: | 0.1 mA |
| the second current value A2: | 40 mA |
| the third current value A3: | 2 mA |
| the fourth current value A4: | 50 mA |
| the first operation time interval D1: | 0.5 μs |
| the second operation time interval D2: | 2 μs |
| the third operation time interval D3: | 1 ms |
| cycles of intermittently turning on and turning off functions n: | 800 |

In FIG. 2, an average current EAVG for driving the communication device STA can be written by:

$$E_{AVG}=(ES+ED)/T$$

ES is denoted as an integrated area of the current during the first time interval T1. ES can be written by:

$$ES = A1 \times T1$$
$$= 0.1 \times 99.4 = 9.94$$

ED is denoted as an integrated area of the current during the second time interval T2. In other words, ED is a sum of an integrated area of the current during the third operation time interval D3 and integrated areas of the current for intermittently turning on and turning off functions (i.e., n cycles) during the first operation time intervals D1 and the second operation time intervals D2. ED can be written by:

$$ED=(A2\times D1+A3\times D2)\times n+A4\times D3=(40\times 0.0005+2\times 0.002)\times 800+50\times 1=69.2$$

T is denoted as a detection period including the first time interval T1 and the second time interval T2. T can be written by:

$$T = T1 + T2$$
$$= 99.4 + 3$$

Therefore, according to the communication parameters listed in Table 1, the average current $E_{AVG}$ for driving the communication device STA can be written by:

$$E_{AVG} = (ES + ED)/T$$
$$= (9.94 + 69.2)/102.4$$
$$= 0.77 \text{ mA}$$

Further, since no power saving function is introduced to the conventional communication device for detecting the energy, an average current $E_{AVG\_ORIGIN}$ for driving the conventional communication device can be derived by directly averaging integrated areas of two rectangular waveforms (two current levels) during the first time interval T1 and the second time interval T2, as:

$$E_{AVG\_ORIGIN} = (0.1 \times 994 + 50 \times 3)/102.4$$
$$= 1.56 \text{ mA}$$

According to the communication parameters listed in Table 1, the average current $E_{AVG}$ for driving the communication device STA is lower than the average current $E_{AVG\_ORIGIN}$ for driving the conventional communication device. A difference between two average currents is around 1.56 mA-0.77 mA. In other words, according to the communication parameters listed in Table 1, at least 50% energy saving rate can be introduced for driving the communication device STA.

Figure 3:
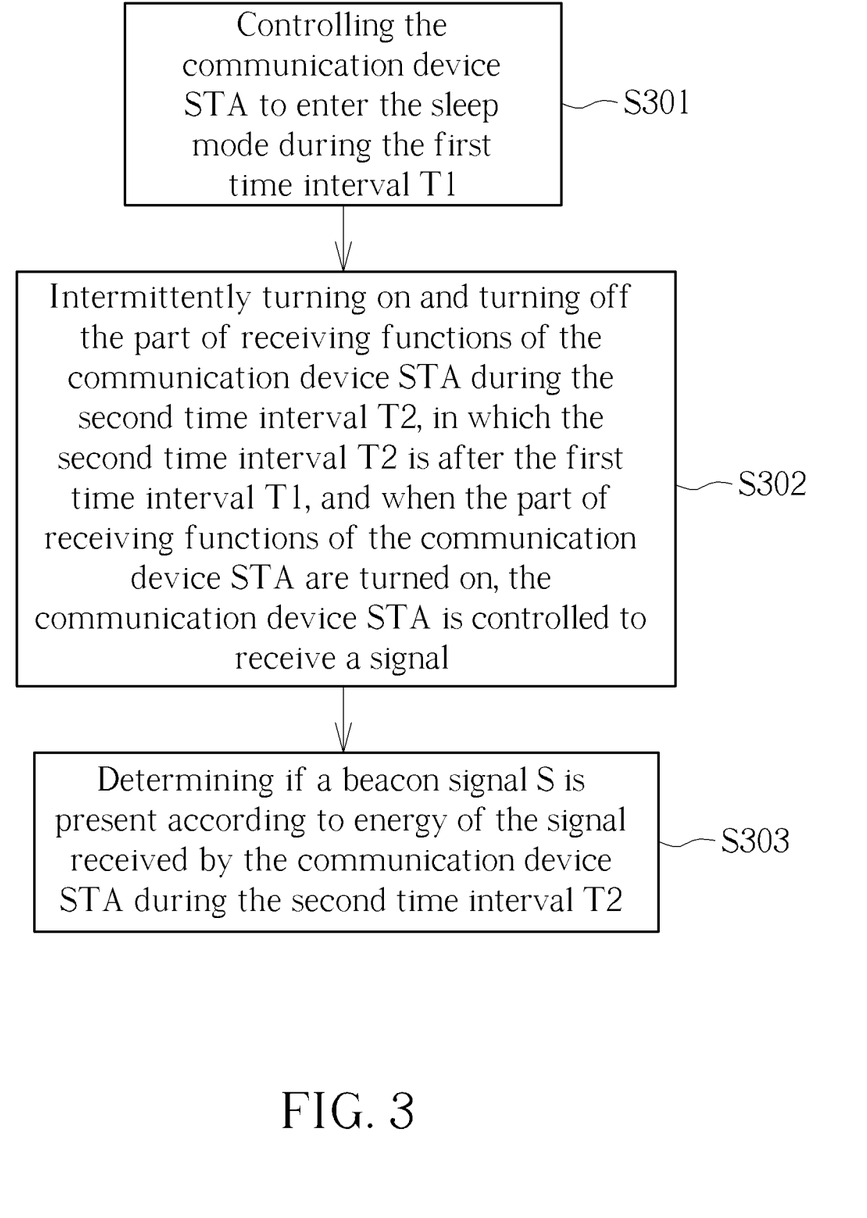
FIG. 3 is a flow chart of an energy detection method with low power consumption performed by the communication device of the communication system in FIG. 1.

FIG. 3 is a flow chart of an energy detection method with low power consumption performed by the communication device 100 of the communication system in FIG. 1. The energy detection method for detecting the beacon signal S can include step S301 to step S303. Any reasonable technology modification falls into the scope of the present invention. Step S301 to step S303 are illustrated below.

step S301: controlling the communication device STA to enter the sleep mode during the first time interval T1;

step S302: intermittently turning on and turning off the part of receiving functions of the communication device STA during the second time interval T2, in which the second time interval T2 is after the first time interval T1, and when the part of receiving functions of the communication device STA are turned on, the communication device STA is controlled to receive a signal;

step S303: determining if a beacon signal S is present according to energy of the signal received by the communication device STA during the second time interval T2.

Details of the step S301 to step S303 are illustrated previously and thus omitted. By performing step S301 to step S303, the communication device STA can use the energy detection method with low power consumption for detecting if the beacon signal S is present. Further, since a delay between a time point of broadcasting the beacon signal S by the signal access point AP and the time point of receiving the beacon signal S by the communication device STA is very small (<1 µs), the detection accuracy can be maintained. By doing so, the communication device STA can use a low-power detection method for detecting the beacon signal S without sacrificing the detection accuracy.

In the communication system 100, any reasonable hardware or technology modification falls into the scope of the present invention. For example, the threshold for determining the presence of the beacon signal S can be customized. The first operation time interval D1 for temporarily turning on the part of the receiving functions of the communication device STA can be customized. The second operation time interval D2 for temporarily turning off the part of the receiving functions of the communication device STA can be customized. Further, a cycle of at least one detection loop of the communication device STA can also be customized. For example, the communication device STA can determine whether the beacon signal S is present and complete after the beacon signal S is successfully received in M detection periods. M can be a positive integer. In other words, the M detection periods form a cycle for jointly detecting the beacon signal S. Alternatively, a distribution of time intervals or lengths of the time intervals for intermittently turning on and turning off the part of the receiving functions of the communication device STA during the second time interval T2 can also be customized. The detection mechanism and parameter configurations of the communication system 100 can be adjusted periodically or non-periodically.

To sum up, the present disclosure provides an energy detection method with low power consumption and a communication system. The communication system includes a signal access point for broadcasting a beacon signal and a communication device for detecting the beacon signal. The communication device can intermittently turn on and turn off a part of receiving functions for detecting preamble energy received by a transceiver. Since the communication device performs an intermittent energy detection mechanism, power consumption can be reduced. Further, although the conventional communication device can enter a sleep mode, all receiving functions of the conventional communication device are continuously turned on, when the conventional communication device is activated, regardless of whether a data packet of the beacon signal is received by the conventional communication device, thereby leading to additional power consumption. However, after a time interval of the sleep mode elapses, the communication device of the present disclosure can perform the intermittent energy detection mechanism for detecting the beacon signal. In other words, the communication device can use a low-power detection method for detecting the beacon signal without sacrificing the detection accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An energy detection method, comprising:
    controlling a communication device to enter a sleep mode during a first time interval;
    intermittently turning on and turning off a part of receiving functions of the communication device during a second time interval, wherein the second time interval is after the first time interval, and when the part of receiving functions of the communication device are turned on, the communication device is controlled to receive a signal; and
    determining if a beacon signal is present according to energy of the signal received by the communication device;
    wherein the first time interval and the second time interval form a detection period, and first average power consumption of the communication device during the second time interval is smaller than second average power consumption of the communication device, in which the second average power consumption corresponds to enabling all receiving functions of the communication device.

2. The method of claim 1, wherein intermittently turning on and turning off the part of receiving functions of the communication device during the second time comprises:
    turning on the part of receiving functions of the communication device during a first operation time interval after entering the second time interval;
    turning off the part of receiving functions of the communication device during a second operation time interval when the energy is smaller than a threshold during the first operation time interval; and turning on the part of receiving functions of the communication device again during a third operation time interval for detecting the beacon signal after the part of receiving functions of the communication device are turned off during the second operation time interval.

3. The method of claim 2, wherein a time length of the second operation time interval is greater than a time length of the first operation time interval, and an average power consumption of the communication device during the first operation time interval is greater than an average power consumption of the communication device during the second operation time interval.

4. The method of claim 1, wherein determining if the beacon signal is present according to the energy of the signal received by the communication device comprises:

performing a correlation matching process of the beacon signal when the energy is greater than or equal to a threshold; and generating a determining result that the beacon signal is present when the energy is greater than or equal to the threshold, and an offset of the energy is smaller than a tolerance value.

5. The method of claim 1, wherein determining if the beacon signal is present according to the energy of the signal received by the communication device comprises:

generating a determining result that the beacon signal is absent when the energy is smaller than a threshold.

6. The method of claim 1, further comprising:

entering a next detection period for continuously detecting the energy or resetting a link function of the communication device when the communication device determines that the beacon signal is absent.

7. The method of claim 1, further comprising:

performing a subsequent link stage process of the communication device when the communication device determines that the beacon signal is present.

8. The method of claim 1, wherein a time length of the first time interval is greater than a time length of the second time interval, and an average power consumption of the communication device during the first time interval in the sleep mode is smaller than the average power consumption of the communication device during the second time interval.

9. The method of claim 1, further comprising:

extracting preamble information of the signal received by the communication device for detecting the energy when the part of receiving functions of the communication device are turned on.

10. The method of claim 1, further comprising:

broadcasting the beacon signal from a signal access point (AP);

receiving the beacon signal by the communication device; and performing a subsequent link stage process of the communication device for generating a data communication request to the signal access point when the energy is greater than a threshold.

11. A communication device capable of detecting presence of a beacon signal broadcasted from a signal access point (AP), the communication device comprising:

a transceiver configured to receive a signal;

an energy detector configured to detect energy of the signal;

a power supply configured to provide driving power of the communication device; and a processor configured to control the power supply;

wherein the processor controls the power supply to make the communication device enter a sleep mode during a first time interval, and the processor controls the power supply to intermittently turn on and off a part of receiving functions of the communication device during a second time interval, in which the second time interval is after the first time interval;

wherein when the part of receiving functions of the communication device are turned on, the processor controls the transceiver to receive the signal, and the processor determines if the beacon signal is present according to the energy detected by the energy detector;

wherein the first time interval and the second time interval form a detection period, and first average power consumption of the communication device during the second time interval is smaller than second average power consumption of the communication device, in which the second average power consumption corresponds to enabling all receiving functions of the communication device.

12. The communication device of claim 11, wherein the processor turns on the part of receiving functions of the communication device during a first operation time interval after entering the second time interval, turns off the part of receiving functions of the communication device during a second operation time interval when the energy is smaller than a threshold during the first operation time interval, and turns on the part of receiving functions of the communication device again during a third operation time interval for detecting the beacon signal after the part of receiving functions of the communication device are turned off during the second operation time interval.

13. The communication device of claim 12, wherein a time length of the second operation time interval is greater than a time length of the first operation time interval, and an average power consumption of the communication device during the first operation time interval is greater than an average power consumption of the communication device during the second operation time interval.

14. The communication device of claim 11, wherein the processor performs a correlation matching process of the beacon signal when the energy is greater than or equal to a threshold, and generates a determining result that the beacon signal is present when the energy is greater than or equal to the threshold and an offset of the energy is smaller than a tolerance value.

15. The communication device of claim 11, wherein the processor generates a determining result that the beacon signal is absent when the energy is smaller than a threshold.

16. The communication device of claim 11, wherein the processor continuously controls the energy detector for detecting the energy during a next detection period when the processor determines that the beacon signal is absent.

17. The communication device of claim 11, wherein the processor performs a subsequent link stage process of the communication device when the processor determines that the beacon signal is present.

18. The communication device of claim 11, wherein a time length of the first time interval is greater than a time length of the second time interval, and an average power consumption of the communication device during the first time interval in the sleep mode is smaller than the average power consumption of the communication device during the second time interval.

19. The communication device of claim 11, wherein the processor extracts preamble information of the signal received by the transceiver for detecting the energy when the part of receiving functions of the communication device are turned on.

20. The communication device of claim 11, wherein the transceiver receives the beacon signal broadcasted from the signal access point, and the processor performs a subsequent link stage process of the communication device for generating a data communication request to the signal access point when the energy is greater than a threshold.

* * * * *